2 Sheets--Sheet 1.

L. J. BAKER.

Sash-Holder.

No. 6,263. Reissued Feb. 2, 1875.

Witnesses
Chas. H. Smith
Harold Serrell

Inventor
Loring J. Baker
per L. M. Serrell
atty

2 Sheets--Sheet 2.

L. J. BAKER.
Sash-Holder.

No. 6,263. Reissued Feb. 2, 1875.

Witnesses

Chas. H. Smith

Harold Sewell

Inventor

Loring J. Baker per L. W. Serrell

Atty.

UNITED STATES PATENT OFFICE.

LORING J. BAKER, OF BOSTON, MASS., ASSIGNOR TO HEZEKIAH BRADFORD.

IMPROVEMENT IN SASH-HOLDERS.

Specification forming part of Letters Patent No. 151,529, dated June 2, 1874; reissue No. 6,263, dated February 2, 1875; application filed November 3, 1874.

*To all whom it may concern:*

Be it known that I, LORING J. BAKER, of Boston, in the county of Suffolk and State of Massachusetts, have invented an Improvement in Sash-Holders, of which the following is a specification:

Before my invention, friction-stops had been employed upon car and other windows, but the levers employed for operating the same were liable to be broken in consequence of their projecting from the window.

My invention is made for stopping the window at any point to which it may be raised; for preventing the window being opened from the outside, and for adjusting the parts to the width of window-frame.

I make use of a slide and thumb or finger piece, connected with a spring that is attached adjustably to a friction clamp or clamps having double inclines on the back, and inclosed in a case, so that when the slide is moved the spring operates to lessen the friction of the clamp, and the case acts to increase the pressure and friction of the clamp against the frame by the weight of the window pressing the incline of the case against the inclined back of the clamp. The window cannot be raised from outside in consequence of the inclined surface of the case coming against the incline of the clamp, and increasing the pressure and friction against the frame.

Figure 1:
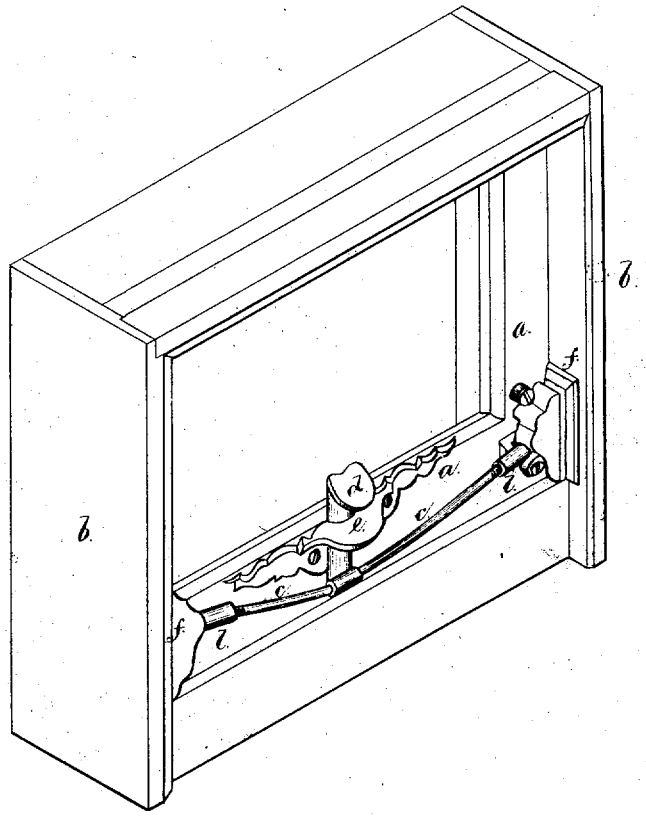
Figure 3:
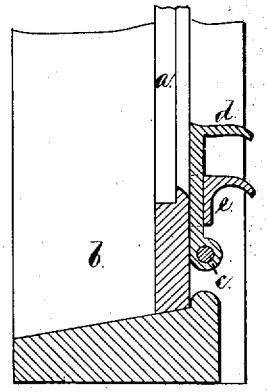
Figure 2:
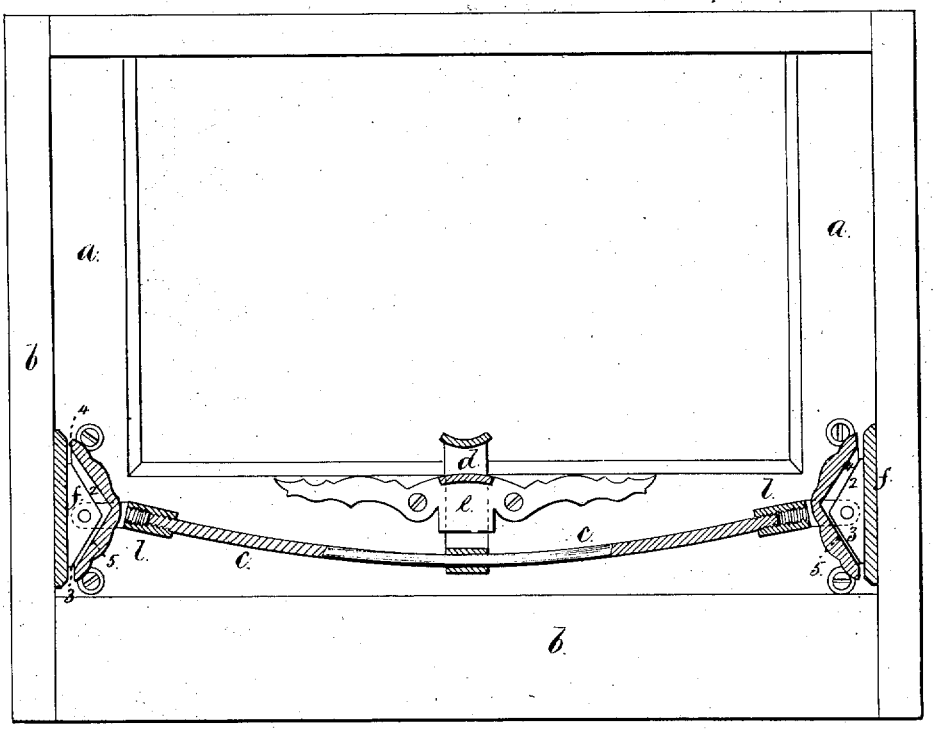
Figure 4:
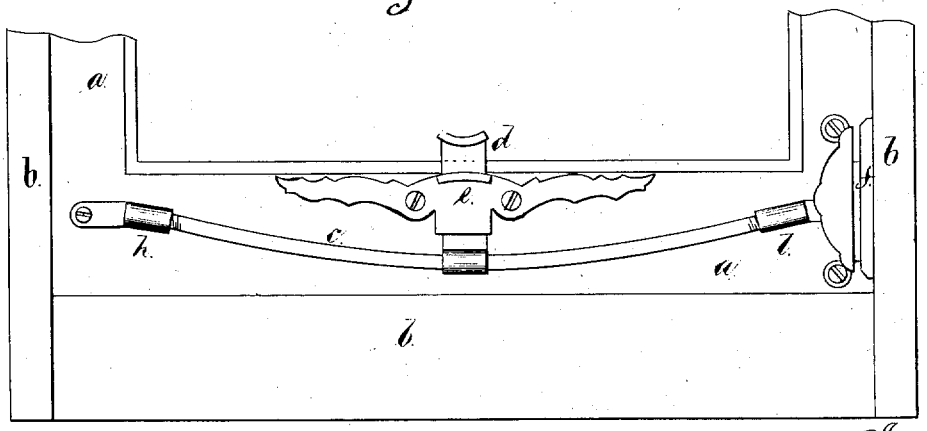

In the drawing, Figure 1 is a perspective view. Fig. 2 is an elevation, with parts of the fastening in section. Fig. 3 is a cross-section at the center of the slide; and Fig. 4 is an elevation.

The sash *a* is fitted to slide in the frame *b*. When the sash is made to raise in opening, my improved holder should be near the bottom of the sash; but if the sash is made to descend into a pocket the holder should be near the top of the sash. The spring *c* is curved; and at or near the middle there is a slide, *d*, that is guided by the lifter *e*, and can move freely therein. The ends of the spring *c* are connected to the friction-clamps *f*, or at one end to a friction-clamp, and at the other to a stationary block, *h*, as seen in Fig. 4.

It is preferable that the screw-shackles *l* be employed to connect the spring *c* and the clamps *f*, so that the parts may be adjusted to suit inequalities in the widths of window-frames, and the shackles *l* are united to the friction-clamps by a joint, so that the surface of the clamp is free to accommodate itself to the frame when holding the sash, and the plate is drawn back bodily when the spring is bent by the slide.

The faces of the friction-clamps *f* are preferably of rubber, and the backs of such clamps are made as double inclines, 2 3, and there are similar inclines, 4 and 5, in or upon the case that receives or supports the friction-clamp.

The thumb or finger piece at the end of the slide *d* and the lifter *e* are simultaneously grasped, when the friction-clamps are to be drawn back and the window raised or lowered. The movement of the slide *d* increases the curvature of the spring *c*, drawing back such clamps, so that the sash can be moved freely up or down; and when the slide is released the spring straightens and presses the clamps against the sides of the frame, and the weight of the sash resting upon the inclines forces the clamp or clamps more firmly against the frame, thereby holding the sash securely.

If an attempt is made to move the window from the outside, when the parts are properly adjusted, and the window is closed or partially closed, the incline 5, pressing against the incline 3 at the back of the friction-clamp, increases the pressure and friction of the clamp against the frame, so that the sash cannot be moved. Thus the clamp locks the sash in a reliable manner at any point it may be placed.

There is little or no strain upon the spring, and the parts are compact, strong, and reliable, and the window can be raised or lowered with one hand, the lifter and thumb-pieces being contiguous and central to the window, and hence they can be operated simultaneously.

The india-rubber surface to the metal plate of the clamp prevents injury to the surface of the window-frame, and at the same time renders the clamp sufficiently adhesive.

I claim as my invention—

1. The spring *c* and shackle *l*, united by a joint to the friction-clamp *f*, in combination with the slide *d* and lifter *e*, substantially as set forth.

2. The combination of the slide *d*, lifter *e*, curved rod *c*, double inclined friction-clamp *f*, and case, substantially as set forth.

Signed by me this 5th day of October, A. D. 1874.

LORING J. BAKER.

Witnesses:
GEO. T. PINCKNEY,
CHAS. H. SMITH.